(12) United States Patent
Werner et al.

(10) Patent No.: US 10,315,860 B2
(45) Date of Patent: Jun. 11, 2019

(54) ARTICLE HANDLING DEVICE

(71) Applicant: The Procter & Gamble Company, Cincinnati, OH (US)

(72) Inventors: Jeffrey Kyle Werner, Liberty Township, OH (US); Robert Scott Bollinger, Stewartstown, PA (US); Cedric Dsouza, Mason, OH (US); Kevin Shih Shaw, Loveland, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 0 days.

(21) Appl. No.: 15/598,341

(22) Filed: May 18, 2017

(65) Prior Publication Data

US 2017/0341878 A1    Nov. 30, 2017

Related U.S. Application Data

(60) Provisional application No. 62/341,368, filed on May 25, 2016.

(51) Int. Cl.
 *B65G 47/86* (2006.01)
 *B25J 15/12* (2006.01)

(52) U.S. Cl.
 CPC ............ *B65G 47/847* (2013.01); *B25J 15/12* (2013.01)

(58) Field of Classification Search
 CPC .............................. B65G 47/847; B66C 1/46
 USPC ................... 198/470.1, 478.1, 803.9, 867.07
 See application file for complete search history.

(56) References Cited

U.S. PATENT DOCUMENTS

| | | | |
|---|---|---|---|
| 1,981,641 A | 11/1934 | Benoit | |
| 2,324,312 A | 7/1943 | Meyer et al. | |
| 3,957,154 A | 5/1976 | Shiba | |
| 4,124,112 A | 11/1978 | Mohney et al. | |
| 4,551,061 A * | 11/1985 | Olenick | .......... B25J 18/06 414/735 |
| 5,029,695 A | 7/1991 | Kovara | |
| 5,046,599 A | 9/1991 | Hamano | |
| 5,082,105 A | 1/1992 | Tincati | |
| 5,540,320 A | 7/1996 | Sarto et al. | |
| 5,590,753 A | 1/1997 | Bertschi et al. | |

(Continued)

FOREIGN PATENT DOCUMENTS

DE    29723881 U1    4/1999
DE    19903319 A    8/1999

(Continued)

OTHER PUBLICATIONS

Festo AG & Co KG, "Bionic Tripod with FinGripper" brochure, 4 pgs.

(Continued)

*Primary Examiner* — Gene O Crawford
*Assistant Examiner* — Lester III Rushin
(74) *Attorney, Agent, or Firm* — Alexandra S. Anoff (57) ABSTRACT

An article handling device is provided. In one embodiment, a system for article handling is provided. The system has first and second article handling devices that each have one or more gripping assemblies arranged around their periphery. The gripping assemblies are selectably movable between an open position and a closed position based on the relative position of the first and second article handling devices.

11 Claims, 9 Drawing Sheets

(56) References Cited

U.S. PATENT DOCUMENTS

| | | | |
|---|---|---|---|
| 6,846,029 B1 * | 1/2005 | Ragner | B25B 9/00 |
| | | | 294/219 |
| 7,007,793 B2 | 3/2006 | Stocchi | |
| 7,398,871 B1 | 7/2008 | Basgil et al. | |
| 7,431,150 B2 | 10/2008 | Ranger | |
| 8,002,107 B2 | 8/2011 | Balzarin et al. | |
| 8,418,836 B2 | 4/2013 | Papsdorf | |
| 8,499,921 B1 | 8/2013 | Orndorff et al. | |
| 8,561,783 B2 | 10/2013 | McAllister et al. | |
| 8,602,471 B2 | 12/2013 | Bodtlander et al. | |
| 8,813,950 B2 | 8/2014 | Papsdorf | |
| 8,820,514 B2 | 9/2014 | Papsdorf | |
| 8,833,543 B2 | 9/2014 | Fahldieck | |
| 9,050,719 B2 * | 6/2015 | Valpola | B25J 9/1694 |
| 9,371,195 B2 | 6/2016 | Papsdorf et al. | |
| 2007/0271871 A1 | 11/2007 | Spence et al. | |
| 2011/0272246 A1 | 11/2011 | Papsdorf | |
| 2012/0118706 A1 | 5/2012 | Schulnig | |
| 2012/0260955 A1 | 10/2012 | Winzinger | |
| 2014/0008927 A1 * | 1/2014 | Rousseau | B29C 49/4205 |
| | | | 294/90 |
| 2015/0344237 A1 | 12/2015 | Papsdorf et al. | |
| 2015/0344238 A1 | 12/2015 | Goudy et al. | |
| 2016/0075036 A1 | 3/2016 | Lessing et al. | |

FOREIGN PATENT DOCUMENTS

| | | | |
|---|---|---|---|
| DE | 102013112656 | 5/2015 | |
| EP | 0355971 B1 | 10/1993 | |
| EP | 0412059 B1 | 2/1994 | |
| EP | 0401698 B1 | 8/1994 | |
| EP | 0659983 B1 | 7/1998 | |
| EP | 0894544 A2 | 2/1999 | |
| EP | 1663824 B1 | 6/2009 | |
| GB | 1518821 A * | 7/1978 | B65G 57/03 |
| JP | 10035879 A | 2/1998 | |
| JP | 2007186271 A | 7/2007 | |
| WO | WO2005030616 A2 | 4/2005 | |
| WO | WO2005123553 A1 | 12/2005 | |
| WO | WO2009040531 A1 | 4/2009 | |
| WO | WO2011015371 A1 | 2/2011 | |
| WO | WO2015191585 A1 | 12/2015 | |

OTHER PUBLICATIONS

International Search Report and Written Opinion dated May 18, 2017, U.S. Appl. No. 15/598,341.

\* cited by examiner

ARTICLE HANDLING DEVICE

TECHNICAL FIELD

The present invention relates to article handling devices for an automated article handling line.

BACKGROUND

Various types of article handling devices are used for handling articles on automated handling lines, such a rotary conveyor devices, linear conveyor devices, and so forth. On an automated handling line that involves filling bottles with liquids, for example, rotary devices may include fillers, cappers, labelers, and star wheel conveyors. Often such rotary devices will be provided with their own drive motor, such as a servo motor, for rotating the rotary device.

It may be necessary for automated handling lines to process articles such as containers of varying shapes and sizes. This has, however, created challenges for article handling devices. For example, in the case of many current star wheels, each star wheel can only handle containers of a specific shape and size, so this requires changing the star wheel plates or disks each time a different container is introduced onto the handling line. This is undesirable as it is both time consuming and necessitates having to keep a stock of different-sized star wheel plates.

Additionally, star wheels and other rotary-type conveyors often utilize a guide rail assembly that is radially spaced from the outer periphery. These guide rail assemblies serve to maintain the radial position of the container when it is engaged with the star wheel by a frictional engagement between the container and the guide rail assembly. This frictional engagement may be undesirable, as the container may be scuffed as it slides along the rail assembly, or labeling/printing on the outside of the container may be rubbed, abraded, or otherwise damaged.

Thus, it would be advantageous to provide for an improved article handling device for automated article handling. In particular, it is desirable to provide an article handling device that can readily handle articles having many different sizes and configurations and is less expensive to manufacture and/or operate than star wheels with multiple change parts. Additionally, it is desirable to provide for article handling devices that maintain the radial position of articles relative to the article handling device without excessive scuffing or rubbing of the outer surface of the articles.

SUMMARY

The present disclosure provides, in one embodiment, an article handling device. In one embodiment, the article handling device comprises a translating member that is translatable along a path. The article handling device and translating member may move (and, thus, move the articles) in a linear path, a curvilinear path; or in a path that comprises both linear portions and curvilinear portions. Non-limiting examples of paths in which the article handling device and translating member may move include: arcuate paths, circular paths, elliptical paths, linear paths, race track configured paths, and other non-closed and closed loop paths. The translating member may have a periphery. The translating member may have at least one gripping assembly joined to the translating member. The at least one gripping assembly may comprise a first arm and a second arm which are selectably movable between an open position and a closed position.

In another embodiment, a system for article handling may be provided. The system may comprise a first article handling device having at least one gripping assembly arranged along or otherwise adjacent to its periphery or some other portion of the article handling device. In some cases, the first article handling device may have more than one gripping assembly arranged around its periphery or other portion thereof. The article handling device(s) in the systems described herein may move articles along any of the types of paths described above. When there is more than one article handling device, they may move articles along the paths having the same configuration (e.g., arcuate, circular, etc.), or paths having different configurations (e.g., one article handling device may move articles in a circular path, and another may move articles in a race-track configured path, or there may be any other combination of paths). In some embodiments, the first article handling device may be a rotary device that is rotatable about a first axis and is capable of conveying articles gripped by at least one gripping assembly along a first arcuate path. The system may also comprise a second article handling device having at least one gripping assembly arranged along or otherwise adjacent to its periphery. The second article handling device may be a rotary device that is rotatable about a second axis and being capable of conveying articles gripped by at least one gripping assembly along a second arcuate path. Each of the gripping assemblies may comprise a first arm and a second arm, wherein each of the gripping assemblies are selectably movable between an open position and a closed position.

BRIEF DESCRIPTION OF THE DRAWINGS

The above-mentioned and other features and advantages of the present disclosure, and the manner of attaining them, will become more apparent and the disclosure itself will be better understood by reference to the following description of nonlimiting embodiments of the disclosure taken in conjunction with the accompanying drawings, wherein.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of the present invention, suitable methods and materials are described below. In addition, the materials, methods, and examples are illustrative only and not intended to be limiting.

Other features and advantages of the invention will be apparent from the following detailed description, and from the claims.

DETAILED DESCRIPTION

The present disclosure provides, in one embodiment, an article handling device. In one embodiment, the article handling device comprises a translating member that is translatable along a path. The path may, or may not, be located on a surface on which one or more articles are conveyed. If more than one article is conveyed, they may be conveyed in succession along the path. The article handling devices of interest herein may be further described as excluding certain types of devices, such as independently actuatable automatic arms, pneumatic arms, and robots.

The article handling device and translating member may move (and, thus, move the articles) in a linear path, a curvilinear path; or in a path that comprises both linear portions and curvilinear portions. Non-limiting examples of paths in which the article handling device and translating member may move include: arcuate paths, circular paths, elliptical paths, linear paths, race track configured paths, and other non-closed and closed loop paths. The translating member may have a periphery. The translating member may have at least one gripping assembly joined to the translating member. The at least one gripping assembly may comprise a first arm and a second arm which are selectably movable between an open position and a closed position.

In another embodiment, the present disclosure provides a system for handling articles on an automated article handling line. The system can comprise one or more article handling devices that are used for handling articles on automated handling lines. On an automated handling line that involves filling bottles with liquids, for example, such article handling devices may include, but are not limited to: fillers, cappers, labelers, and rotary-type wheel conveyors. For purposes of illustration, some of the article handling devices are shown and described in the context of rotary-type wheel conveyors for passing a stream of articles from a first rotary device to a second rotary device. However, the rotary devices can be used to pass streams of articles to other types of equipment and processing devices, such as linear conveyors, conveyor screws, and so forth. Thus, it is understood that the present invention is not limited to use with a rotary-type wheel conveyor, and can be used (as applicable) with any suitable rotary, linear, indexing, or other article handling device.

The article handling devices described herein can be used to convey numerous different types of three dimensional articles along an automated article handling line. Such articles include, but are not limited to: bottles, cans, containers, razors, razor blade heads and handles, tampon tubes, deodorant stick containers, bags, cartons, and pucks and carriers which convey other articles within. The article handling devices can easily transport conventionally-shaped articles (e.g., cylindrical, and/or symmetrical articles), as well as being particularly suited to transport and control articles having shapes that are challenging to transport by other types of rotary-type wheel conveyors. The article handling devices can, for example, be used to transport: bottles with non-flat or rounded bottoms that would be unstable on a horizontal surface; bottles with small bases that will easily tip; bottles with angled and/or off-center necks; asymmetrical bottles; bottles of non-constant cross-section, and so forth.

Various nonlimiting embodiments of the present disclosure will now be described to provide an overall understanding of the principles of the function, design and operation of the article handling devices. One or more examples of these nonlimiting embodiments are illustrated in the accompanying drawings. Those of ordinary skill in the art will understand that the methods described herein and illustrated in the accompanying drawings are nonlimiting example embodiments and that the scope of the various nonlimiting embodiments of the present disclosure are defined solely by the claims. The features illustrated or described in connection with one nonlimiting embodiment may be combined with the features of other nonlimiting embodiments. Such modifications and variations are intended to be included within the scope of the present disclosure.

Figure 1:
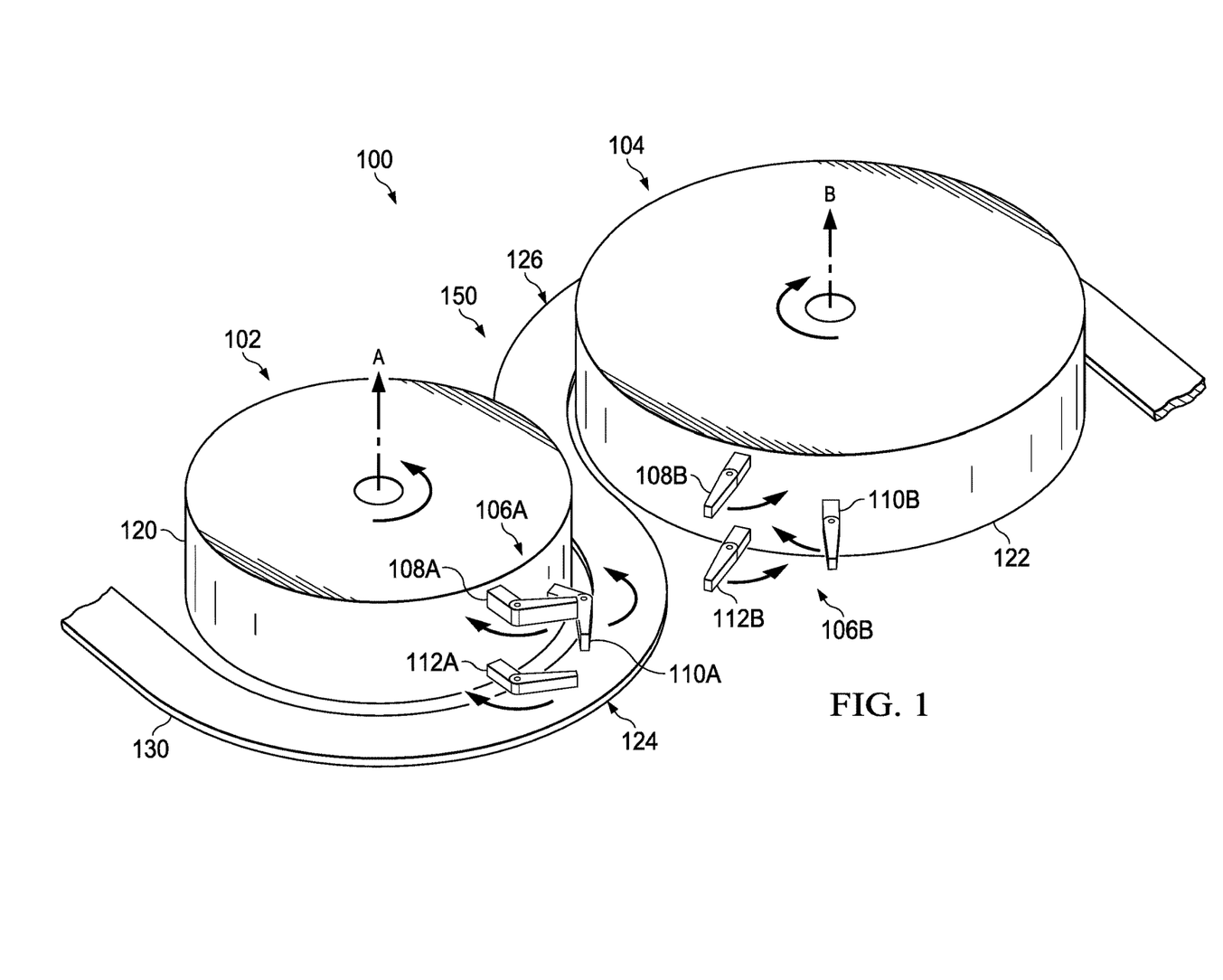
FIG. 1 depicts a system for article handling comprising a first article handling device and a second article handling device.

FIG. 1 depicts a system for article handling 100 comprising a first article handling device 102 and a second article handling device 104. The system for article handling 100 conveys three dimensional articles (not shown) along an article path 130. The article path 130 includes a first arcuate path 124 proximate to the first article handling device 102 and a second arcuate path 126 proximate to the second article handling device 104. The first arcuate path 124 and the second arcuate path 126 merge at a hand off zone 150, which is located between the first article handling device 102 and the second article handling device 104. The first article handling device 102 and the second article handling device 104 are each rotatable in a plane of rotation about an axis, shown as axis A and axis B, respectively. Articles handled by the system 100 are typically conveyed with their bases in a given plane. The axis A and the axis B are perpendicular to the plane of article conveyance and the plane of rotation. While the first article handling device 102 and the second article handling device 104 are schematically depicted as being similarly sized, this disclosure is not so limited. As is to be appreciated, in some configurations the first article handling device 102 may have an outer diameter that is either larger or smaller than the outer diameter of the second article handling device 104, as may be required by the configuration of the automated article handling line. Further, while the first article handling device 102 and the second article handling device 104 are shown as rotary-style article handling devices that circularly rotate and thus transport articles in a circular path, other article handling devices in accordance with the present disclosure may have different configurations that transport articles in other paths.

Each of the first article handling device 102 and the second article handling device 104 has at least one gripping assembly, shown as gripping assembly 106A and gripping assembly 106B, respectively. At least a portion of the gripping assembly 106A generally extends outwardly from a periphery 120 of the first article handling device 102 and at least a portion of the gripping assembly 106B generally extends outwardly from a periphery 122 of the second article handling device 104. While the gripping assemblies 106A, 106B are schematically depicted as being joined or coupled to the periphery 120, this disclosure is not so limited. In some configurations, for instance, the gripping assembly 106A and gripping assembly 106B may be coupled to the article handling device inboard of the periphery 120. Further, the gripping assemblies 106A, 106B may be coupled to any suitable element of the respective article handling device, such as a spoke, paddle, arm, or axle, for instance. The gripping assemblies 106A, 106B can each comprise a plurality of arms, which may be individually or collectively actuated, folded, inflated, deflated, pivoted, translated or otherwise moved relative to one another during article handling. Further, while the gripping assembly 106A is depicted as having a first arm 108A, a second arm 110A, and a third arm 112A and the gripping assembly 106B is depicted as having a first arm 108B, a second arm 110B, and a third arm 112B, this disclosure is not so limited. Instead, the gripping assemblies 106A, 106B can include any suitable configuration of arms that is capable of selectively gripping an article to transport the article along the article path 130. Each gripping assembly may, therefore, comprise one, two, three, four, or more arms. The number of arms in each gripping assembly may be the same, or different.

The gripping assemblies 106A, 106B are selectably movable between an open position and a closed position. In FIG. 1, the gripping assembly 106A is depicted in a closed position and the gripping assembly 106B is depicted in an open position. As described in more detail below, the moving of the gripping assemblies 106A, 106B between the open and closed positions can be registered to the radial position of the respective first and second article handling devices 102, 104. The gripping assembly 106A is in the closed position as it grips an article and transports the article along the first arcuate path 124 towards the hand off zone 150. Concurrently, the second article handling device 104 rotates in an opposite direction, and the gripping assembly 106B is in the open position as it approaches the hand off zone 150 in preparation for receiving the article from the gripping assembly 106A. During a handoff event, the gripping assembly 106B is moved to the closed position such that it begins to grip the article that was conveyed by the gripping assembly 106A. The gripping assembly 106A is moved to the open position thereby releasing its grip on the article and allowing possession to transfer to the gripping assembly 106B. It is noted that the moving of the gripping assembly 106A from the closed position to the open position can occur before or after the moving of the gripping assembly 106B from the open position to the closed position. For instance, in some configurations, the gripping assembly 106A may move to the open position after the gripping assembly 106B has been moved to the closed position. In some configurations, the gripping assembly 106A may first partially open, such as through the articulation of less than all of the arms 108A, 110A, 112A, or partially articulate all of the arms 108A, 110A, 112A towards an open position. Then, once the gripping assembly 106B has been moved to the closed position, the gripping assembly 106A can complete the opening process. As is to be appreciated upon consideration of the current disclosure, the particular cadence of opening and closing the gripping assemblies 106A, 106B can vary based on a number of factors, such as line speed, article handling device size, article path of travel, article size, gripping assembly configuration, and so forth.

The gripping assemblies 106A, 106B may have complementarily arranged components or features, such that during the handoff event, portions of the gripping assembly 106A are interleaved or zippered with portions of the gripping assembly 106B within the handoff zone 150. In the illustrated embodiment, the second arm 110A of the leading side of the gripping assembly 106A is positioned such that as the gripping assemblies 106A, 106B simultaneously pass through the hand off zone 150, the second arm 110A is received into the vertical space defined between the first arm 108B and the third arm 112B of the second gripping assembly 106B. Similarly, the trailing side of the gripping assembly 106B has the second arm 110B that is positioned such that as the gripping assemblies 106A, 106B simultaneously pass through the hand off zone 150, the second arm 110B is received into the vertical space defined between the first arm 108A and the third arm 112A of the first gripping assembly 106A.

Figure 2:
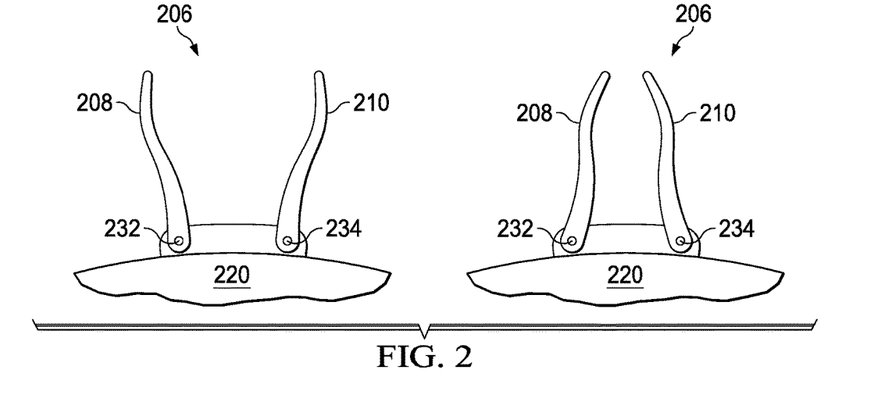
FIG. 2 shows one non-limiting example of a gripping assembly.
Figure 3:
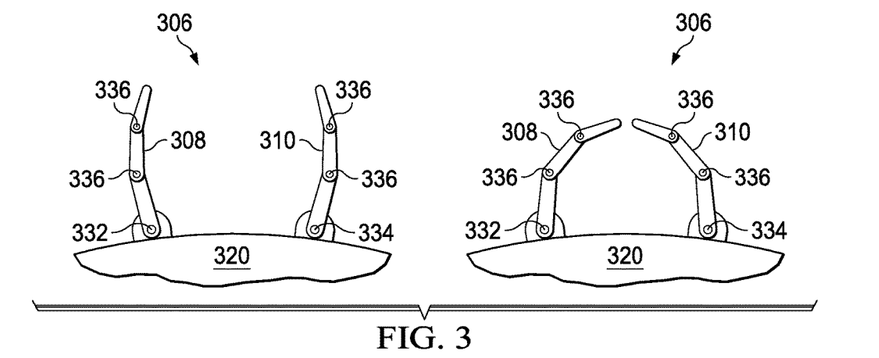
FIG. 3 shows another non-limiting example of a gripping assembly.
Figure 4:
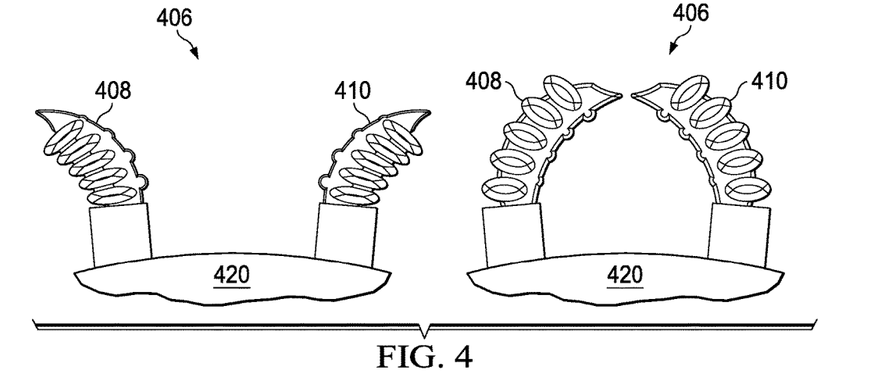
FIG. 4 shows another non-limiting example of a gripping assembly.

While FIG. 1 depicts gripping assemblies 106A, 106B having arms with a pivoting distal portion, this disclosure is not so limited. Referring now to FIGS. 2-4, additional non-limiting examples of gripping assemblies having various configurations are depicted. Each gripping assembly 206, 306, 406 is depicted in a closed position and an open position. In some configurations, the inner surface of the arms of the gripping assemblies 206, 306, 406, or the entire arm itself may be a softer, flexible, and/or compliant material that can conform to the article being gripped and offer high friction to secure the article during transport.

Referring first to the gripping assembly 206 of FIG. 2, a first arm 208 and a second arm 210 are shown extending from a periphery 220 of an article handling device. The first and second arms 208, 210 may have any suitable profile, such as straight, curved, curvilinear, and so forth. The first arm 208 and the second arm 210 are pivotable relative to each other via first and second pivot points 232, 234. Referring next to the gripping assembly 306 of FIG. 3, a first arm 308 and a second arm 310 are shown as segmented arms that extend from a periphery 320 of an article handling device. Each segmented arm 308, 310 has segment pivot points 336 to connect adjacent segments and allow articulation. The first arm 308 and the second arm 310 can pivot relative to each other via first and second pivot points 332, 334 and via the segment pivot points 336. Referring next to the gripping assembly 406 of FIG. 4, a first arm 408 and a second arm 410 are shown as sealed bladders that extend from a periphery 420 of an article handling device. Each of the first and second arms 408, 410 articulate in a first direction (i.e., toward the closed position) in response to internal pressurization and articulate in a second direction (i.e., toward the open position) in response to internal depressurization. Nonlimiting examples of arms suitable for use in the gripping assembly of FIG. 4 are described in U.S. Patent Application Publication No. 2016/0075036 A1, Lessing, et al. and PCT WO 2015/191585 A1 (Soft Robotics, Inc.).

While FIGS. 2-4 schematically depict the gripping assemblies 206, 306, and 406 as having opposing arms of similar construction, in some configurations the gripping assembly can include a variety of different arms, materials, size, articulation, or other features to assist with the gripping functionality. For instance, the arm or arms on one side of the gripping assembly may be longer or shorter than the arm or arms on the other side of the gripping assembly. Additionally or alternatively, one arm can have a first configuration or structure and another arm or portion of the gripping assembly can have a different configuration or structure. Further yet, while the gripping assemblies 206, 306, and 406 depict arms on both sides that can move, in some configurations, an arm or arms on only one side of the gripping assembly can move.

Figure 5:
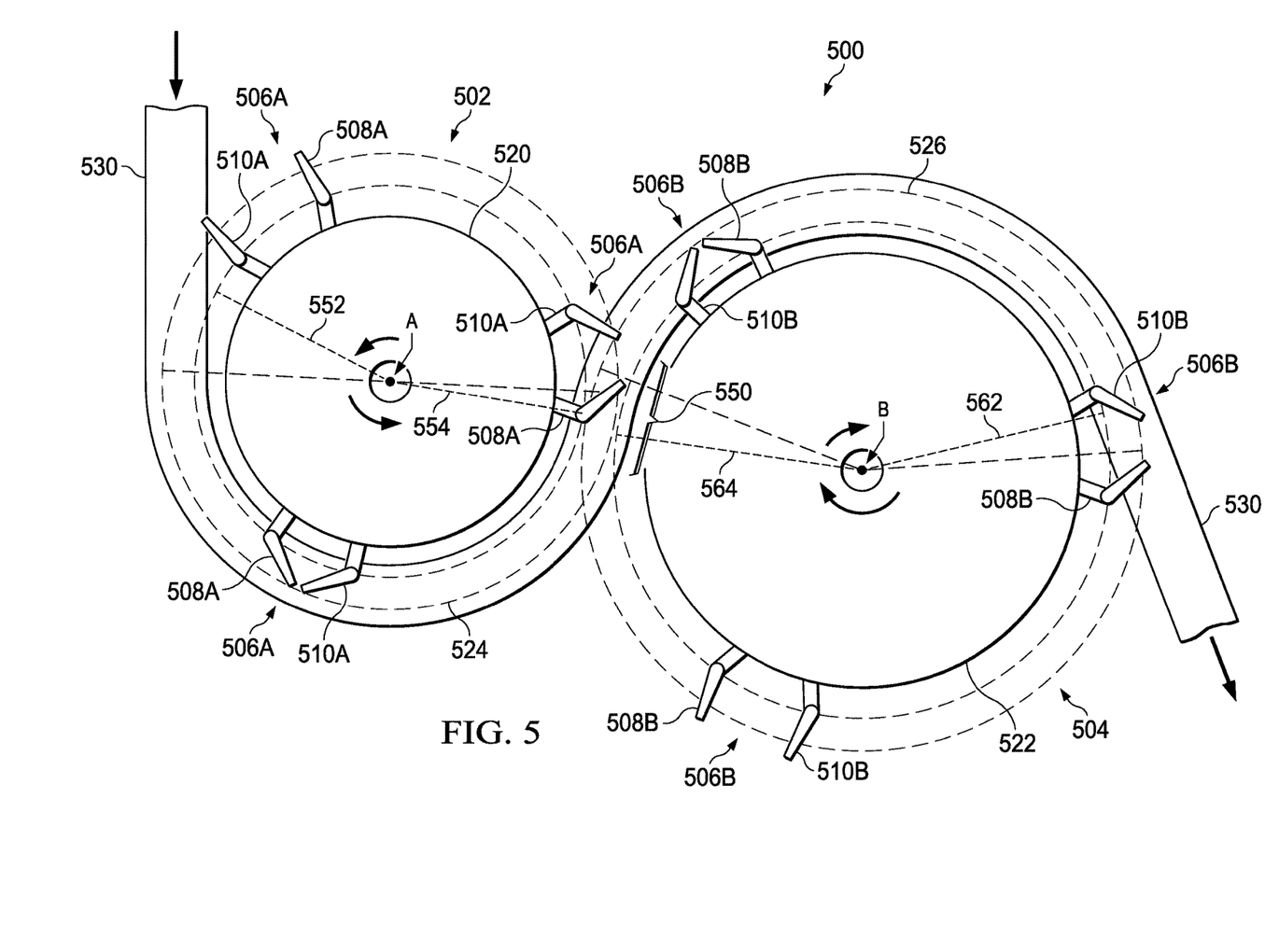
FIG. 5 is a top view of a system for article handling comprising a first article handling device and a second article handling device.

FIG. 5 is a top view of a system for article handling 500 comprising a first article handling device 502 and a second article handling device 504. The system for article handling 500 conveys three dimensional articles (not shown) along an article path 530. The article path 530 includes a first arcuate path 524 proximate to the first article handling device 502 and a second arcuate path 526 proximate to the second article handling device 504. The first arcuate path 524 and the second arcuate path 526 merge at a hand off zone 550, which is located between the first article handling device 502 and the second article handling device 504. The first article handling device 502 and the second article handling device 504 are each rotatable in a plane of rotation about an axis, shown as axis A and axis B, respectively. While the first article handling device 502 and the second article handling device 504 are schematically depicted as being similarly sized and being rotary-style article handling devices, this disclosure is not so limited.

Each of the first article handling device 502 and the second article handling device 504 has a plurality of gripping assemblies arranged around its periphery 520, 522, respectively. While FIG. 5 depicts three gripping assemblies 506A arranged around the first article handling device 502 and three gripping assemblies 506B arranged around the second article handling device 504, other systems can use any number of gripping assemblies (one, two, three, or more) in any alternative arrangements. Each of the gripping assemblies 506A is depicted having a first arm 508A and second arm 510A. Similarly, each of the gripping assemblies 506B is depicted as having a first arm 508B and second arm 510B. FIG. 5 also depicts that the gripping assemblies 506A, 506B are periodically moved between an open position and a closed position as the associated article handling device rotates about its axis of rotation.

Referring to the first article handling device 502 rotating in the counterclockwise direction, as the gripping assembly 506A departs the handoff zone 550, it is in the open position as the article that it had been gripping has been handed off to the second article handling device 504. As the gripping assembly 506A approaches the article path 530, it can begin to close when it reaches an actuation point 552. The position of actuation point 552 relative to the rotation of the first article handling device 502 can be coordinated with articles approaching on the article path 530 such that the gripping assembly 506A is timed to close on the article. With the article gripped by the gripping assembly 506A, the article is transported along the first arcuate path 524 as the first article handling device 502 continues to rotate. When the gripping assembly 506A reaches the next actuation point 554, it will begin to open. This actuation point 554 is proximate to the hand off zone 550, as it is coordinated with a receiving gripping assembly 506B on the second article handling device 504. While in the handoff zone 550, the gripping assembly 506A can interleave with the gripping assembly 506B that is receiving the article during the handoff. The gripping assembly 506A is then moved to a fully opened position as it leaves the hand off zone 550.

Referring now to the second article handling device 504 rotating in the clockwise direction, as the gripping assembly 506B departs the handoff zone 550, it is in the closed position as it has received an article in the handoff zone 550. With the article gripped by the gripping assembly 506B, the article is transported along the second arcuate path 526 as the second article handling device 504 rotates about its axis of rotation. As the gripping assembly 506B approaches the end of the second arcuate path 526, it can begin to open at an actuation point 562. The actuation point 562 can be coordinated with a downstream processing apparatus or process, such as a conveyor, a conveyor screw, another rotary device, or other equipment. The gripping assembly 506B is then moved to a fully open position to release the article. As the gripping assembly 506B continues to rotate, it will again approach the hand off zone 550. When it reaches the next actuation point 564, it will begin to close to grip the articles being conveyed by the first article handling device 502. The gripping assembly 506B is moved to a fully closed position as it leaves the hand off zone 550.

The gripping assembly 506A and the gripping assembly 506B can be configured to interleave within the handoff zone 550. Further, the relative radial distance between the actuation point 554 of the first article handling device 502 and the actuation point 562 of the second article handling device 504 can vary. In the illustrated configuration, the actuation point 564 occurs prior to the actuation point 554. Therefore, the receiving gripping assembly 506B is configured to begin to grip the article prior to the gripping assembly 506A releasing the article. In some configurations, the radial distance between the actuation points 554 and 564 can be adjustable. For instance, certain line speeds, articles, or line processes may require the radial distance between the actuation points 554 and 564 to be shortened or lengthened to improve performance.

Figure 6:
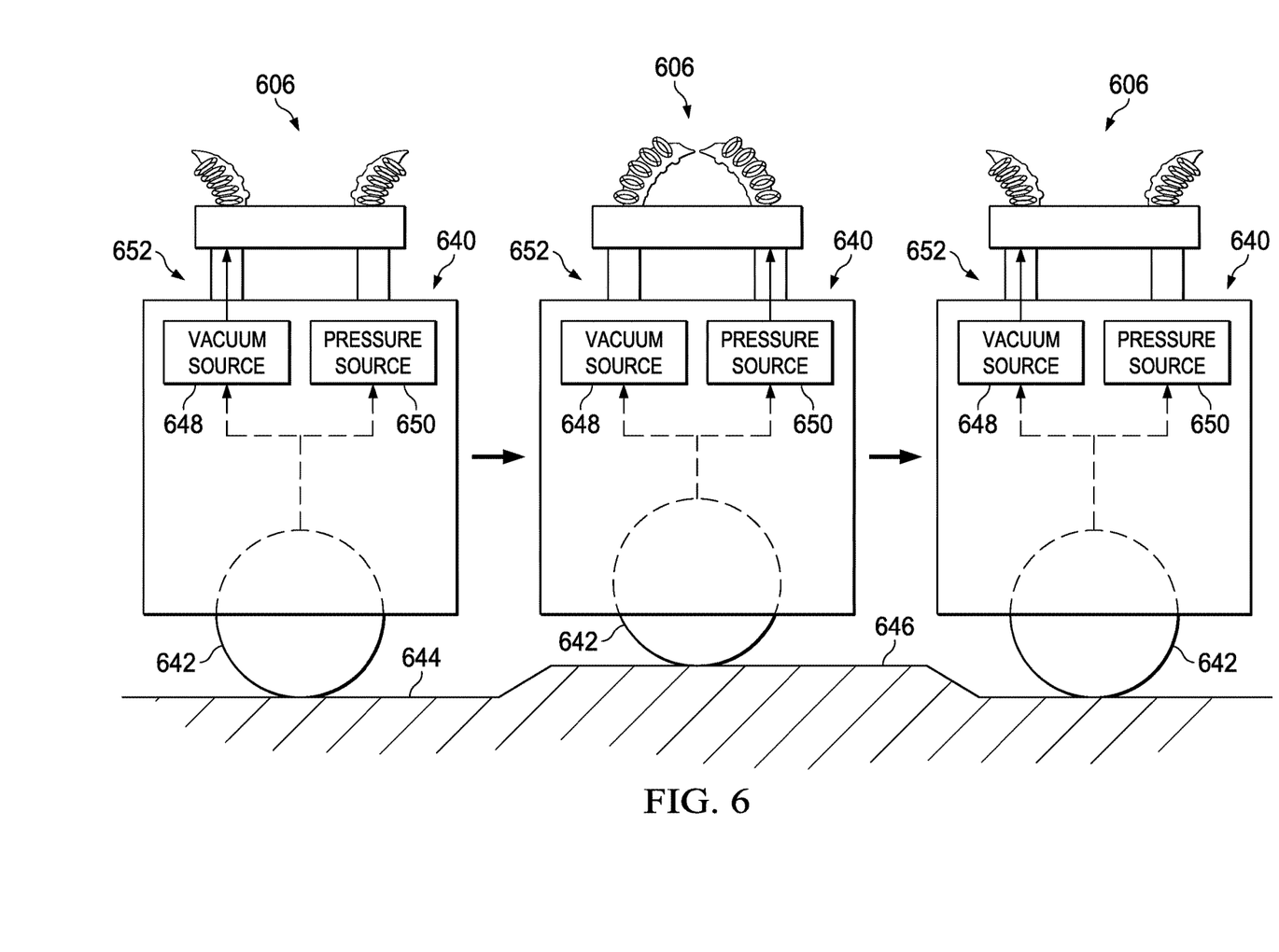
FIG. 6 schematically depicts one example of a technique for moving gripping assemblies between an open position and a closed position.
Figure 7:
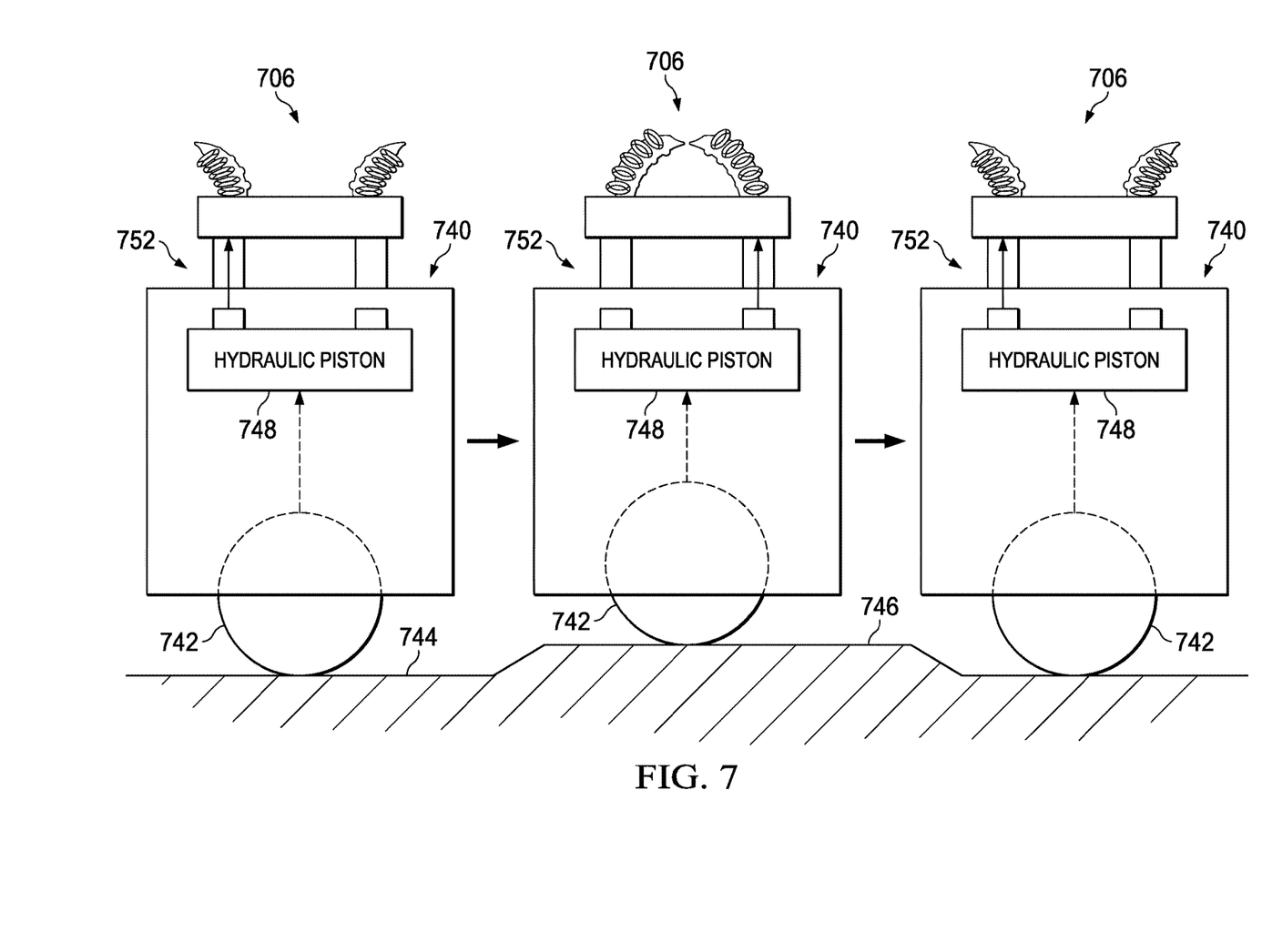
FIG. 7 schematically depicts another example of a technique for moving gripping assemblies between an open position and a closed position.
Figure 8:
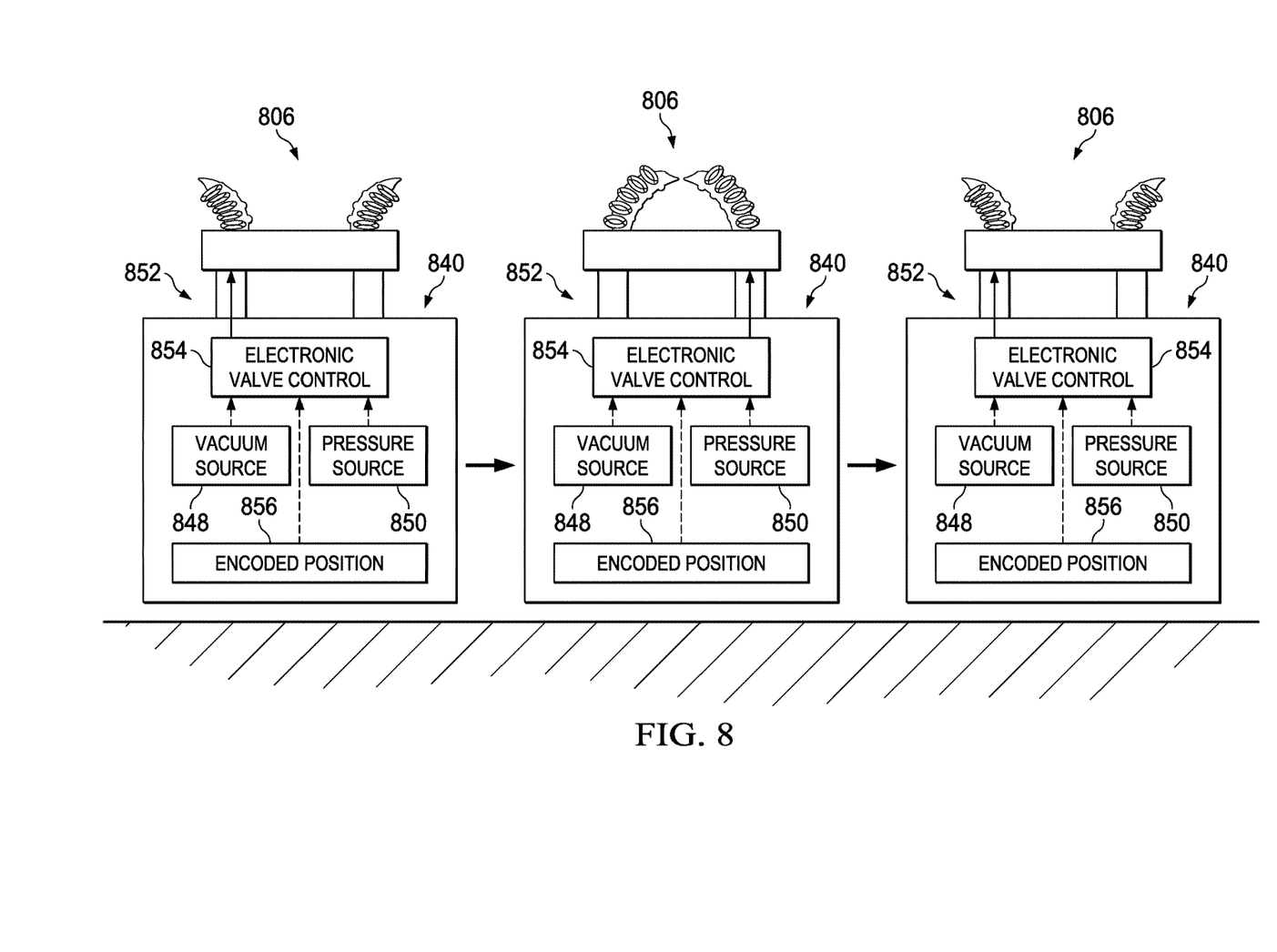
FIG. 8 schematically depicts another example of a technique for moving gripping assemblies between an open position and a closed position.

FIGS. 6-8 schematically depict example actuation techniques for moving gripping assemblies between an open position and a closed position. While FIGS. 6-8 depict gripping assemblies similar to the gripping assembly 406 of FIG. 4, it is to be appreciated that this gripping assembly is shown for illustration purposes only. Referring first to FIG. 6, a gripping assembly actuator 640 is shown that is configured to move a gripping assembly 606 between an open position and a closed position. The gripping assembly actuator 640 is in communication with a vacuum source 648 and a pressure source 650. The vacuum source 648 and the pressure source 650 can be in communication with the gripping assembly 606 via a manifold 652. The vacuum source 648 and the pressure source 650 can be positioned onboard an associated article handling device or positioned remote from the associated article handling device, such as at a centralized air/vacuum source. The gripping assembly actuator 640 also comprises a ball valve 642 that is configured to engage with a surface 644. In some configurations, the ball valve 642 is positioned proximate to a bottom surface of the gripping assembly 606 or an associated article handling device. For a rotary-style article handling device, the ball valve 642 can rotate along a travel path about the axis of the article handling device, for example. The position of the ball valve 642 can control the whether the vacuum source 648 is applied to the gripping assembly 606 or the pressure source 650 is applied to the gripping assembly 606. As illustrated, a cam surface 646 can be positioned within the travel path of the ball valve 642. As the ball valve 642 engages with the cam surface 646, the pressure source 650 is applied to the gripping assembly 606 which then transitions to the closed position. As is to be appreciated, the slope of the ramp of the cam surface 646 can be used to change the speed at which the gripping assembly 606 actuates. A steep ramp can cause a relatively quick closing action, whereas a gradual ramp can cause a relatively slower closing action. As shown in FIG. 6, the gripping assembly 606 is caused to open when the ball valve 642 passes the cam surface 646 and the vacuum source 648 is again applied to the gripping assembly 606. While the ball valve 642 is shown to actuate the entire gripping assembly 606, in some configurations a separate ball valve can be used to individually control one or more arms of a gripping assembly. Accordingly, certain arms of a gripping assembly can be configured to move at different times and/or different speeds than other arms of the gripping assembly.

FIG. 7 schematically depicts another technique for actuating a gripping assembly. A gripping assembly actuator 740 is shown that is configured to move a gripping assembly 706 between an open position and a closed position. The gripping assembly actuator 740 includes a hydraulic piston 748 that is in fluid communication with the gripping assembly 706 via a manifold 752. A ball valve 742 is configured to engage with a surface 744. The position of the ball valve 742 controls the piston, such that actuation of the ball valve 742 translates the hydraulic piston 748. The gripping assembly 706 is hydraulically controlled such that translation of the hydraulic piston 748 opens and closes the gripping assembly 706. Similar to FIG. 6, a cam surface 746 can be utilized to actuate the ball valve 742 at the desired radial positions. As the ball valve 742 engages with the cam surface 746, the hydraulic piston 748 is translated and, in turn, the gripping assembly 706 transitions to the closed position. The gripping assembly 706 is then caused to open when the ball valve 742 passes the cam surface 746 and the hydraulic piston 748 returns to original position.

FIG. 8 schematically depicts another technique for actuating a gripping assembly. In this configuration, the gripping assembly actuator 840 includes an electronic valve control 854. The electronic valve control 854 is in communication with a vacuum source 848 and a pressure source 850 and can selectively apply one or the other to a gripping assembly 806 through a manifold 852. The timing of the application of either the vacuum source 848 or the pressure source 850 is based on the position of the associated article handling device. As shown, an encoded position 856 is provided to the electronic valve control 854 as the article handling device rotates or otherwise translates. Based on the position, the gripping assembly actuator 840 can open or close the gripping assembly 806. Electronic valve control 854 can provide for, for instance, variable timing control of the gripping assembly 806.

Figure 9:
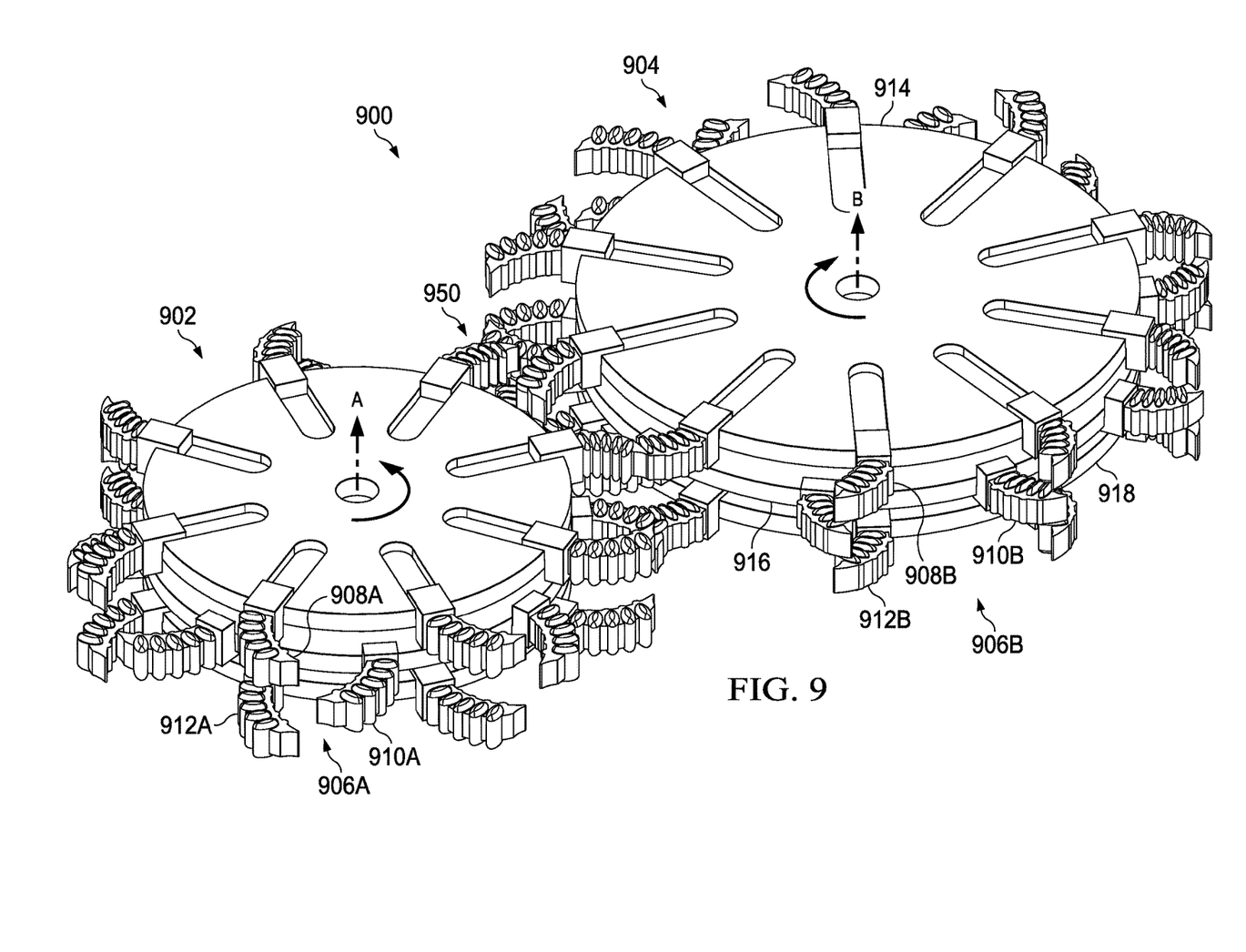
FIG. 9 illustrates a perspective view of a system for article handling having a first article handling device and a second article handling device each having gripping assemblies.
Figure 10:
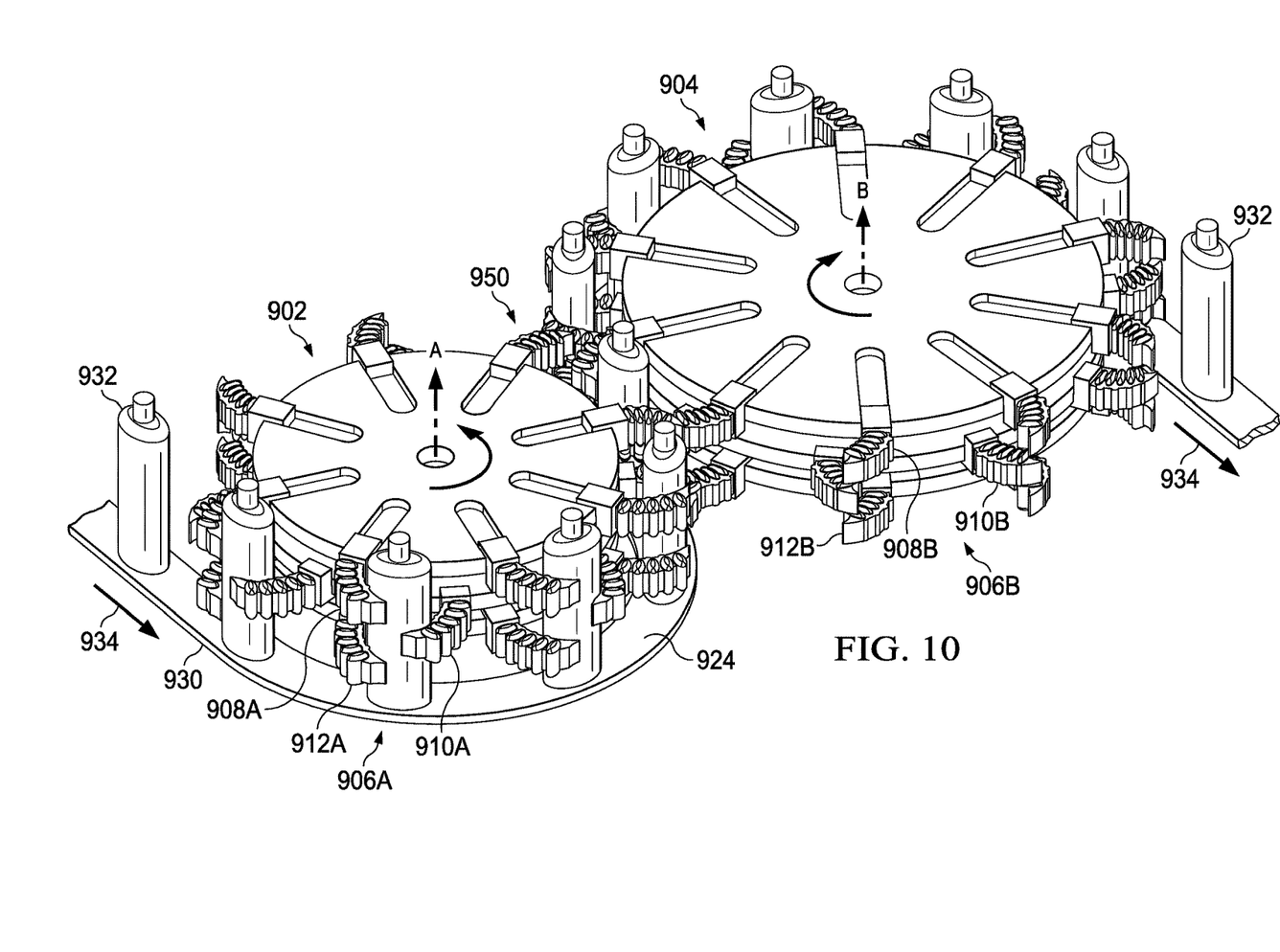
FIG. 10 illustrates the first article handling device and the second article handling device shown in FIG. 9 handling articles.

FIG. 9 illustrates a perspective view of a system for article handling 900 having a first article handling device 902 and a second article handling device 904. The article handling device 902 is shown having eight gripping assemblies and the article handling device 904 is shown having ten gripping assemblies. For the purposes of illustration, both article handling devices 902, 904 are depicted as rotary-style article handling devices. FIG. 10 illustrates the system for article handling 900 of FIG. 9 handling articles 932 of an article stream traveling in the direction indicated by arrow 934. The first article handling device 902 includes gripping assemblies 906A. The gripping assemblies 906A include a first arm 908A, a second arm 910A, and a third arm 912A. The second article handling device 904 includes gripping assemblies 906B. The gripping assemblies 906B include a first arm 908B, a second arm 910B, and a third arm 912B. The first and second article handling devices 902, 904 are each stacks of rotating platters. As shown in FIG. 9, the second article handling device 904 has a top platter 914, a middle platter 916, and a bottom platter 918. Each one of the platters carries one of the arms of the gripping assemblies 906B. More particularly, the top platter 914 carries the first arm 908B, the middle platter carries the second arm 910B, and the bottom platter 918 carries the third arm 912B. As such, increasing the relative spacing between the top platter 914, the middle platter 916, and the bottom platter 918 can result in increasing the height of the gripping assembly 906B. While circular platters are depicted in FIGS. 9-10, any suitable translated member can be utilized, such as, rotatable members, spokes, arms, and so forth.

Referring to FIG. 10, the first article handling device 902 is shown rotating in the counterclockwise direction. As the gripping assemblies 906A depart the handoff zone 950, they are in the open position as the article that they had been gripping has been handed off to the second article handling device 904. As the gripping assemblies 906A approach an article path 930, the timing of the closing is coordinated so that each of the gripping assemblies 906A closes on the article 932. With the article 932 gripped by the gripping assembly 906A, the article is transported along a first arcuate path 924 as the first article handling device 902 continue to rotates. When the gripping assembly 906A reaches an actuation point, it will begin to open. This actuation point is proximate to the hand off zone 950 and is coordinated with a receiving gripping assembly 906B on the second article handling device 904. The gripping assembly 906A is moved to a fully opened position as it leaves the hand off zone 950.

As shown, the second article handling device 904 is rotating in the clockwise direction. As the gripping assemblies 906B depart the handoff zone 950, they are in the closed position as they have received the article 932 in the handoff zone 950. With the article 932 gripped by the gripping assembly 906B, the article 932 is transported along the second arcuate path as the second article handling device 904 rotates about it axis of rotation. As the gripping assembly 906B approaches the end of the second arcuate path, it opens so the article 932 can be released to the next process. The gripping assembly 906B is then rotated towards the hand off zone 950 while in the open position. Once in the handoff zone 950, the gripping assembly 906B will begin to close to grip the article 932 being conveyed by the first article handling device 902. The gripping assembly 906B is moved to a fully closed position as it leaves the hand off zone 950.

Figure 11:
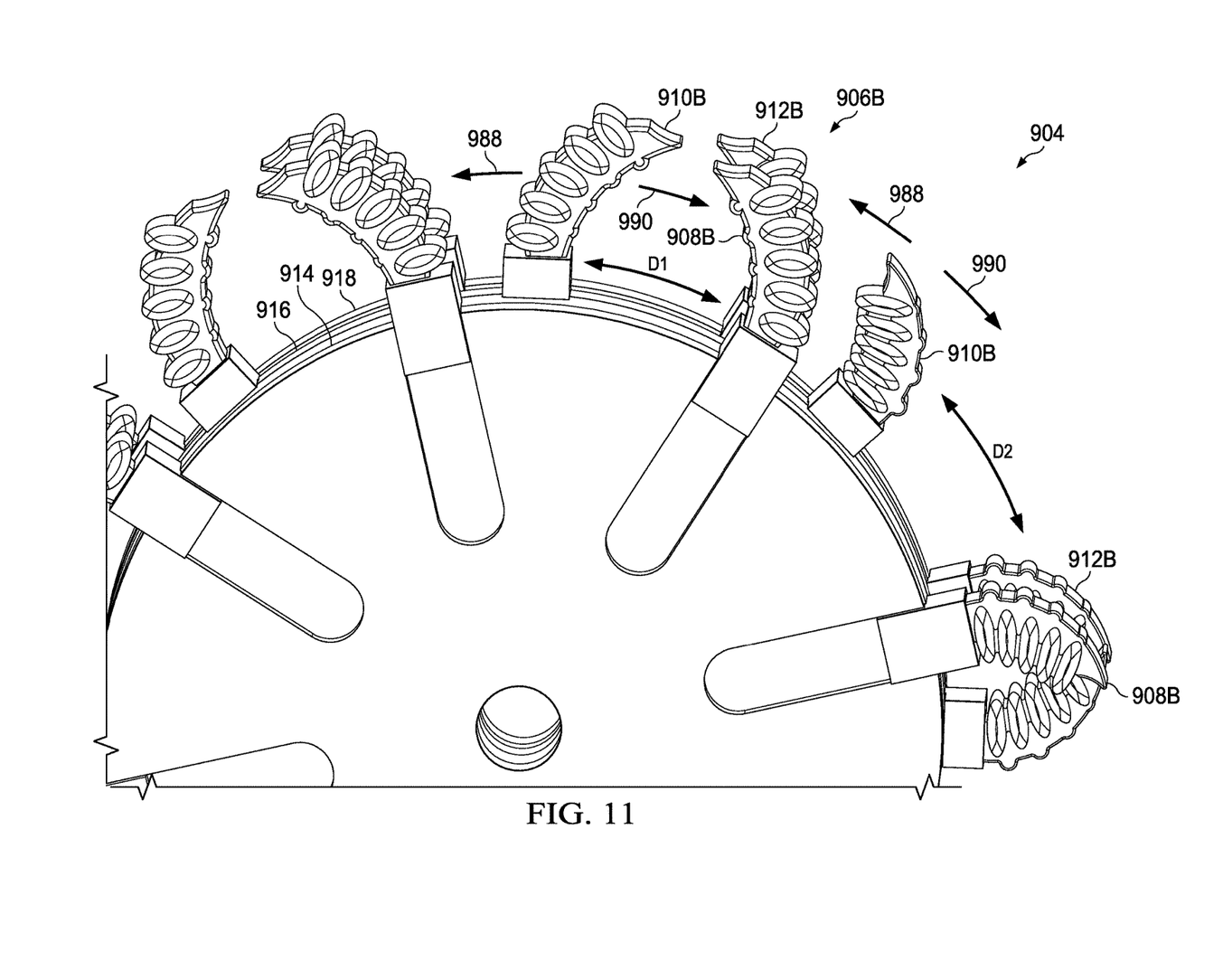
FIG. 11 depicts an example adjustable arm of the gripping assemblies of the second article handling device shown in FIG. 9.

In order to provide flexibility in article processing, in some configurations the gripping assemblies are adjustable so they can accommodate various types of articles. FIG. 11 depicts an example adjustable arm of the gripping assemblies 906B of the second article handling device 904. The gripping assembly 906B is shown to have a gripping width shown as D1 and an open width of D2. Depending on the size of the article being processed, D1 and D2 may be too large or too small. In the illustrated arrangements, the second arm 910B is translatable in a first lateral direction 988 and a second lateral direction 990. Such translation can be facilitated by the middle platter 916 rotating around the axis of rotation relative to the top platter 914 and the bottom platter 918. After translation, the lateral distance between the second arm 910B and the other arms (i.e., the first arm 908A and the third arm 912B) can increased or decreased. Alternatively, each platter can be adjusted independently to change the gripping points along the vertical dimension of the article being conveyed by the article handling device. Further yet, adjustment of the platters can be synchronized between opposing arms so that the center-point of the article is generally maintained.

The term "joined to" encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element.

The dimensions and/or values disclosed herein are not to be understood as being strictly limited to the exact numerical dimensions and/or values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for article handling, the system comprising:
a first article handling device having gripping assemblies arranged around its periphery, the first article handling device being capable of conveying articles gripped by the gripping assemblies along a first path; and
a second article handling device having gripping assemblies arranged around its periphery, the second article handling device being capable of conveying articles gripped by the gripping assemblies along a second path; and
wherein each of the gripping assemblies comprising a first arm, a second arm, and a third arm wherein each of the gripping assemblies are selectably movable between an open position and a closed position, wherein each of the arms comprises an inner surface and wherein the inner surface or the entire arm comprises a material that is soft, flexible, and/or compliant and can conform to the article being gripped;
wherein the first arm positioned offset from the second arm; and
wherein the third arm positioned offset from the second arm;
wherein the gripping assemblies of the first article handling device extend into the first path and the gripping assemblies of the second article handling device extend into the second path, wherein the first path and the second path merge at a hand off zone defined between the first article handling device and the second article handling device.

2. The system for article handling of claim 1, wherein the third arm positioned generally parallel to the second arm.

3. The system for article handling of claim 1, wherein the gripping assemblies of the first article handling device interleave the gripping assemblies of the second article handling device within the hand off zone during rotation of the first and second article handling devices.

4. The system for article handling of claim 3, wherein the gripping assemblies of the first article handling device are in the closed position during approach to the hand off zone and the gripping assemblies of the second article handling device are in the open position during approach to the hand off zone.

5. The system for article handling of claim 4, wherein the gripping assemblies of the first article handling device are in the open position during departure from the hand off zone and the gripping assemblies of the second article handling device are in the closed position during departure from the hand off zone.

6. The system for article handling of claim 1, wherein the gripping assemblies are pneumatically movable between the open position and the closed position.

7. The system for article handling of claim 1, wherein the gripping assemblies are hydraulically movable between the open position and the closed position.

8. The system for article handling of claim 1, wherein the gripping assemblies are mechanically movable between the open position and the closed position.

9. The system for article handling of claim 1, wherein the gripping assemblies are electrically movable between the open position and the closed position.

10. The system for article handling of claim 1, wherein at least one of the first and second arms of each of the gripping assemblies is any of a segmented arm, a pivoting arm, and an inflatable flexible arm.

11. The system for article handling of claim 1, wherein at least one of the first and second arms is laterally translatable relative to the other of the first and second arms to alter a width of the gripping assembly.

* * * * *